Nov. 26, 1929.  H. C. OLIVIER  1,737,325

INTERNAL BRAKE DUST GUARD

Filed Feb. 6, 1928

Inventor

Herman C. Olivier

By Blackmore, Spencer & Hulse

Attorneys

Patented Nov. 26, 1929.

1,737,325

UNITED STATES PATENT OFFICE

HERMAN C. OLIVIER, OF DETROIT, MICHIGAN, ASSIGNOR TO GENERAL MOTORS CORPORATION, OF DETROIT, MICHIGAN, A CORPORATION OF DELAWARE

INTERNAL-BRAKE DUST GUARD

Application filed February 6, 1928. Serial No. 252,273.

This invention relates to brakes and is intended for use with internal brakes on motor vehicles.

In such brakes as now used dust, dirt and water enter the enclosure carrying the shoes, band, or other brake operating mechanism and do so in spite of the smallness of the gap between the drum and the cover plate. This foreign matter interferes with the best operation of the brake and lessens the life of the frictional lining and brake drum.

An object of the invention is to provide a brake drum housing construction to keep the brake mechanism free from foreign matter. A further object is to control the air pressures adjacent the gap between the drum and the backing plate and inside the brake drum. As a further object the invention aims to employ a construction at once effective, simple, and economical to manufacture.

The drawing shows several embodiments of the inventive idea.

It is well-known that no matter how carefully the adjacent edges of the fixed backing plate and the rotating drum are positioned to avoid a space through which foreign matter may enter, the results are not satisfactory. It is believed that the exclusion of foreign matter from the space within the brake drum must be obtained by an arrangement which takes into consideration the local differences in air pressure around the drum, caused by the air stream due to the movement of the car and the rotation of the wheels. As the cylindrical drum carried by the vehicle rotates and moves forwardly, it is a well-known aerodynamical fact that the drum circumference will be exposed to air pressures which vary locally; as a rule, high pressure areas and low pressure areas will be found alternately around the drum. It follows that there is a tendency for air to enter the drum through the gap between the drum and backing plate in the region of high pressure and to leave the drum through the gap at the region of low pressure. Air driven into the drum between the backing plate and the drum at the high pressure region enters a large space of relatively less pressure and tends in this space to drop its load of dust and dirt, to the injury of the brake mechanism. It is intended that a brake drum housing in accordance with this invention shall, in large measure, equalize the air pressure along the gap between the dust shield and the drum and prevent the air currents through the drum.

Figure 2:
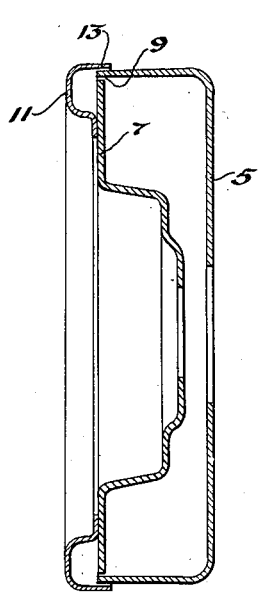
Figure 2 is a section substantially on the line 2—2 of Figure 1.

In the drawing: Numeral 5 represents a brake drum and 7 a backing plate. This backing plate may serve as usual as the anchor for brake shoes and as the journal bearing for the cam or other actuating means. Numeral 9 is applied to the gap between parts 5 and 7. That a gap must be provided will be understood since it is known that the drum must rotate relative to the backing plate. In accordance with this invention an annular member 11 of channel shape in section is secured in any convenient way to the backing plate 7 and overlaps the margin of the drum. An annular gap 13 is formed between the channel 11 and the drum 5 as shown in Figure 2.

Near the front of the brake as vehicle advances the pressure will be high and will tend to build up pressure within the annulus 11. At one or more other points about its circumference the pressure will be low and air entering at the high pressure region will tend to travel around the annular channel and escape at the low pressure regions. This condition of pressure difference tends to produce the air flow through the annular enclosure. The pressure difference tends therefore to be equalized by a flow of air through the annular channel instead of through the brake drum 5. The foreign matter swept into the enclosure by the entering air is carried around the annular channel and escapes therefrom in the low pressure regions. In this way the foreign matter is largely kept from entering into the brake drum.

Figure 1:
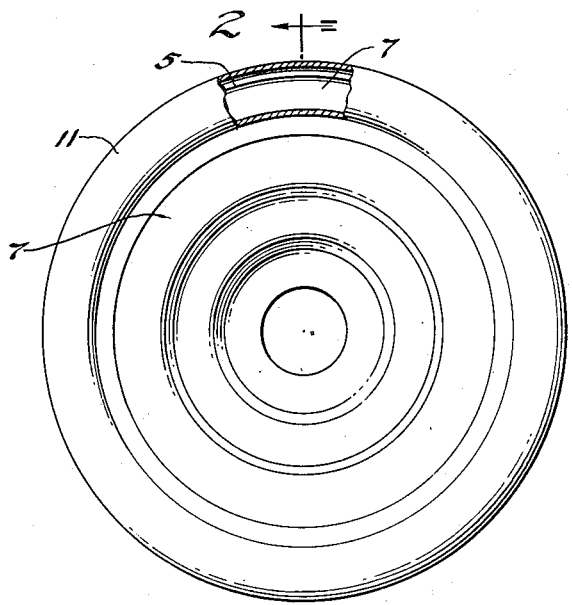
Figure 1 illustrates a first embodiment in side elevation, partly broken away.
Figure 3:
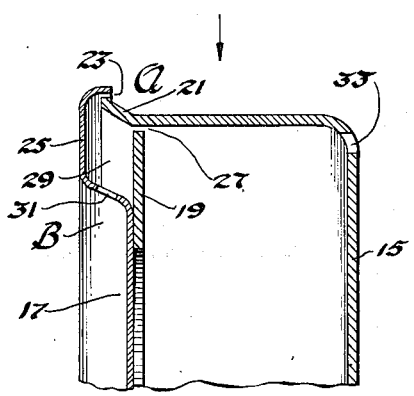
Figure 3 illustrates a modification, the view being in section corresponding to the section shown in Figure 2.

In Figure 3 is shown another construction which may embody the inventive idea. In this form the drum is designated by numeral 15, the backing plate by numeral 17 and a third annular plate by numeral 19. The drum 15 is outwardly flared as at 21 and a gap 23 is present between the drum and the outwardly cupped peripheral part 25 of the backing plate 17. In this form of the invention the third plate 19 is within and secured in any convenient manner to that part of the backing plate 17 radially within the cupped part 25. A gap 27 is present between the inner part of the drum and the peripheral edge of plate 19. Numeral 29 designates the annular channel formed by the cupped portion of the backing plate and the third plate 19. The structure thus far described differs from that shown in Figure 1 chiefly in the relative position of the backing plate and the third plate to form the annular enclosure. The inwardly projecting part of the drum at 21 serves to direct the air current inwardly and away from the gap 27. This figure shows a development of the invention constituted by the provision of an opening 31. Several of such openings may be formed, preferably one or more adjacent a high pressure region and one or more adjacent a low pressure region. The purpose of these openings is to reduce the length of travel of the air current through the annular channel. If Figure 3 be considered a section through high pressure region, the air moving in the direction of the arrow, the pressure at A generally is high while at a point B radially inward from A the pressure generally is lower. Here the opening at 31 permits an escape of air from A to B through the channel. This carries the dirt and dust directly away and reduces the pressure within the annular channel 29 between points A and B. This reduction in pressure at a high point reduces the intensity of the air current within the annular channel from the point A to a low pressure region. If now, considering Figure 3 as a low pressure region, A be regarded as a low pressure point, the pressure at B will generally be higher and the flow will occur from B to A through the low pressure region of the channel and the pressure within the channel at that point will be somewhat increased. This increase of internal pressure at a low pressure region cooperating with a decrease at the high pressure region lessens the intensity of the current through the channel and serves to further equalize the pressure within the channel and adjacent the gap communicating with the brake drum. These openings 31 also, of course, serve directly to eliminate the dust.

In this figure, also, there is shown another development which the invention may take. An opening is shown in the brake drum itself at 33 adjacent the peripheral flange. This opening 33 may serve to illustrate one of several such openings around the periphery of the drum. It is clear that it is possible not only to create substantially uniform pressure in the annulus 29, but also to make that uniform pressure higher than the uniform atmospheric pressure of the air through which the car moves, namely, by making gap 23 wider at high pressure regions and lower at low pressure regions; the annulus 29 will then be more subject to high pressure than to low pressure; vice versa, by making gap 23 wide at low pressure regions and narrow at high pressure regions, it is possible to maintain a lower pressure in annulus 29 than prevails in the atmosphere. Suitable location and size of the holes 31 will help to obtain the results sought. If it be desired to raise the pressure within annulus 29 the openings 31 adjacent the high pressure region will be reduced in size or number, or omitted, and at the low pressure region these holes will be of large size. If it be desired to reduce the pressure within annulus 29 below that of the surrounding air, not only will opening 23 at the high pressure region be made small, but a large opening, or openings, 31 will be made use of at this point. Also, at the low pressure region of the drum where opening 23 is large, the hole 31 will be of small size, or omitted altogether. It is clear that by so doing, a continuous air current can be maintained from annulus 29 through gap 27 and out through holes 33, or, if a low pressure is maintained in annulus 29, the air will flow in through holes 33 and out through gap 27. This air flow may advantageously be used to clean the brake interior from dust, such as created by wear of brake lining and brake drum.

Figure 4:
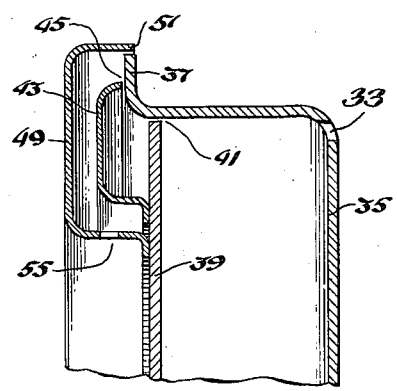
Figure 4 is a sectional view similar to Figure 3 but illustrating another modified form of the invention.

In Figure 4 is illustrated a still further development of inventive idea. In this form drum 35 has its axial flange provided with a radial flange 37. The backing plate 39 is shown and is like the backing plate 7 of Figure 2. The gap 41 between the backing plate and the drum is as before. A first annular member, channel shape in section, is designated by numeral 43. It is secured to the backing plate 39 in any convenient manner and is dimensioned to form a gap 45 with a mid portion of the radial flange 37. A second annular plate 49, channel shape in section and larger than the first channel member, encloses the first, is secured to the backing plate, and is spaced from the end of flange 37 by a narrow gap 51. Openings 55 may be made in the channel member 49 if desired, these openings corresponding to and serving the purpose of the opening 31 shown in the channel member illustrated in Figure 3. The operation of the form of the invention illustrated in Figure 4 is substantially like that of the other forms. The air pressure adjacent gap 45 is first equalized by the outer channel member 49 in substantially the same way that the air pressure adjacent gap 27 in Figure 3 is equalized by the channel member 25. Should such equalization be considered insufficient, member 43 will serve to still further equalize the air pressure adjacent the gap 41. It will be understood too that should it be found necessary openings 33 in the drum may be used. This figure shows two encircling channel members 43 and 49, the number of channel members shown being merely typical of the use of the plurality of such channel members in place of a single such member as shown in Figure 3.

By the constructions shown in these figures it is believed that the inequalities of air pressure adjacent the gap between the conventional brake drum and its backing plate can be largely done away with and that the air currents through the drum resulting from such inequalities will therefore be prevented. It is believed that the doing away with the air currents through the drum will, to a very large extent, prevent the accumulation of dust and other foreign matter within the drum to the detriment of the linings.

I claim:

1. In combination, a drum, a cover of such dimensions as to form an annular gap peripherally between itself and the drum, a second member also constructed to form an annular gap between itself and the drum, said cover and second member forming an annular channel having communication with the drum enclosure by one of said gaps and with the outer air by the other of said gaps, said annular channel having an opening to the outside air inwardly from its outer peripheral portion.

2. A brake drum assembly comprising parts forming an enclosure for brake mechanism, said parts including a rotatable drum and a fixed closure plate, a third plate, annular in form, said third plate and outer annular portion of said first closure plate forming a second enclosure, one of said parts constituting the second annular enclosure being channel-shaped in cross-section, there being an annular gap between the radially outer part of the second enclosure and the drum periphery affording communication between the second enclosure and the outer air, there being also an opening in a radially inward part of the second enclosure in communication with the outer air.

3. In a brake drum assembly, a hollow drum and a closure plate forming an enclosure, there being an annular gap therebetween at the periphery of the closure plate, an annular plate member channel-shaped in cross section, said annular plate member and the outer rim portion of the first closure plate forming a second enclosure, a third outer channel plate member, said third outer channel plate member and the first mentioned annular plate member constituting a third annular enclosure.

4. The invention defined by claim 3, each of said channel members being peripherally in closely spaced relation with spaced peripheral parts of said drum.

5. In a brake, a drum, a cover plate, means associated with said drum and cover plate to maintain substantially uniform the air pressure throughout the length of the gap between said drum and cover plate, said means comprising an annular member of channel shape in section, the gap between the drum and cover opening into said channel, said annular channel having at least one opening radially inward from its outer periphery to equalize the air pressure in the channel.

6. The invention defined by claim 5, together with at least one opening in said drum adjacent its periphery.

In testimony whereof I affix my signature.

HERMAN C. OLIVIER.